Figure 3:
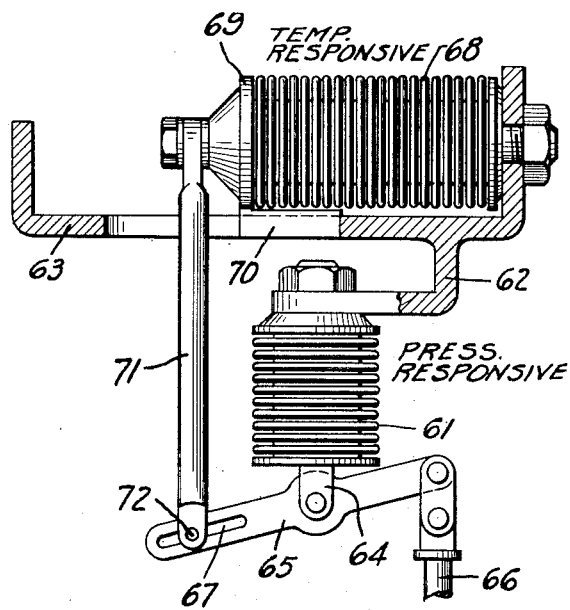

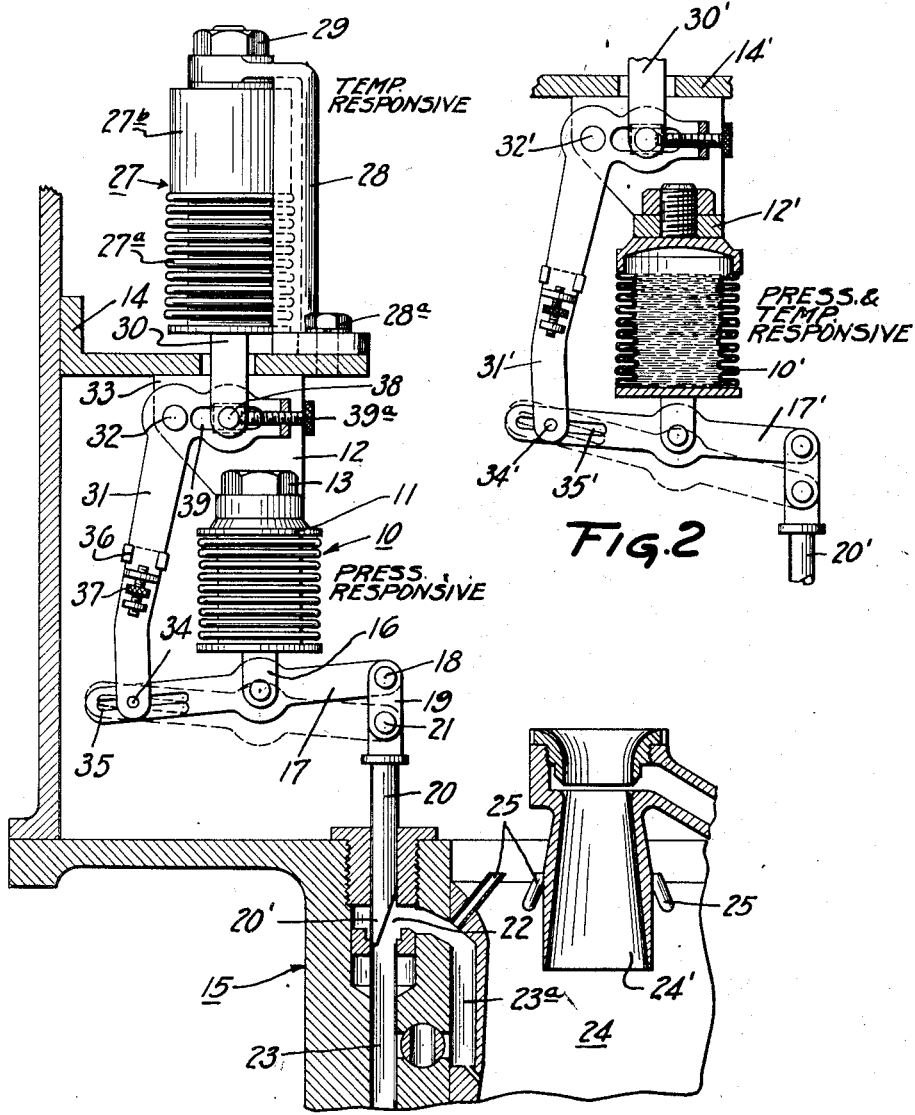

Patented Dec. 15, 1953

2,662,757

UNITED STATES PATENT OFFICE 2,662,757

DENSITY RESPONSIVE DEVICE

Frank C. Mock, South Bend, Ind., assignor to Bendix Aviation Corporation, South Bend, Ind., a corporation of Delaware Application March 1, 1944, Serial No. 524,534

7 Claims. (Cl. 261—39)

This invention relates to improvements in density responsive control devices of that type utilizing a pressure-responsive element and a temperature-responsive element coordinated to obtain a response to changes in density irrespective of whether such changes occur in the pressure component, the temperature component or both components.

An object of the invention is to provide a control unit embodying coacting pressure and temperature-responsive elements having their respective movements correlated to transmit compensating motion to an element to be controlled in direct relation to changes in density, or to transmit such motion in relation to different proportional combinations of temperature and pressure.

It is sometimes desirable to have a control which, instead of compensating or regulating exactly as a function of density, is capable of producing under or overcompensation for temperature. An example of this may be found in carburetors for aircraft internal combustion engines where undercompensation for temperature results in undertravel of the air-metering valve and consequent enrichment of the fuel mixture at extremely high temperatures with resultant cooling; and in the case of "velocity enrichment," where it is desirable to undercompensate for temperature so that the combined effects of the temperature on venturi suction and the control unit will produce an overall response such that substantially constant fuel-air proportioning will obtain.

Again, it is sometimes desirable to apply an inverted or reverse temperature correction to a control capsule of the type containing a gas at approximately ground level barometric pressure to partially reduce the effectiveness of the temperature compensating characteristic inherent in such a capsule, since in this instance while the capsule will give approximately correct temperature compensation at ground level pressures, it will overcorrect for temperature changes as higher altitudes are encountered due to different internal and external combinations of temperature and pressure as the bellows expands and the internal volume thereof changes.

Another object of the invention, therefore, is to provide a density control unit wherein the needle valve or other member to be controlled may be caused to respond in direct relation to density, viz., to the ratio of pressure divided by temperature, or may be caused to respond to a greater or lesser extent to temperature, for instance, to pressure divided by the square root of temperature or some function between $$\frac{P}{T} \text{ and } \frac{P}{\sqrt{T}}$$

A further object is to provide a density-responsive device capable of transmitting motion to an element to be controlled in direct relation to changes in density or biased to a greater or lesser degree in relation to changes in the temperature component of density, and which may be readily adjusted between a maximum and minimum range of temperature compensation or correction.

The foregoing and other objects and advantages will become apparent in view of the following description taken in conjunction with the drawings, wherein:

Figure 1 is a view in sectional side elevation of a control device in accordance with the invention;

Figure 2, a duplication of parts of Figure 1 but showing an alternative initial setting of the correction or compensating linkage when used with a density control capsule of the damping fluid and gas-filled type; and Figure 3, a view in side elevation of a modification.

Referring to the drawings in detail and first to Figure 1, a pressure-responsive bellows is generally indicated at 10. To render the bellows responsive to pressure only, it may be evacuated to a relatively high degree so as to be substantially devoid of any temperature-responsive medium. The bellows may have sufficient spring force built therein or it may be spring-loaded to maintain it in a partially extended condition at ground level barometric pressures, or to prevent collapse of the bellows beyond a predetermined balanced condition due to evacuation. Thus as external air pressure decreases due, for example, to a gain in altitude, the bellows extends itself in direct relation to the drop in pressure. At its upper end, the bellows is provided with a cap 11 which is connected to a bracket 12 by means of nut 13, said bracket 12 forming part of a main supporting bracket 14 adapted to be mounted on any suitable support, here shown mounted in the air scoop or conduit of an aircraft engine adjacent the deck of a carburetor, generally indicated at 15. The lower end of the bellows 10 is provided with a plate or cap somewhat similar to the cap 11, and to this plate is rigidly connected a yoke 16 on which is fulcrumed a lever arm 17, the latter at one end being pivotally connected by means of pin 18 to a pair of straddle links 19 which in turn are pivoted to the one end of a valve member 20 by means of pin 21. The lower end of valve member 20 is provided with a metering or needle valve 20' adapted to coact with a valve port 22 to variably restrict the quantity of air admitted to an air-metering passage 23 from annular chamber 23a surrounding the venturi 24 and receiving air from impact tubes 25. The passage 23 is adapted to conduct a measured quantity of air to the air pressure differential chamber, not shown, of the carburetor 15. The air conducted to this chamber registers scoop pressure on one side of an air diaphragm, the opposite side of which is subjected to suction from boost venturi 24'. The pressure differential across this diaphragm is a measure of carburetor air intake flow and when corrected by the automatic control element forming the subject matter of the present invention, is a measure of mass air flow. For a more complete description and illustration of such a carburetor reference may be had to my copending application Serial No. 202,206, filed April 15, 1938, now Patent No. 2,390,653.

A temperature-responsive element, here shown in the form of a capsule generally indicated at 27, is supported by an upstanding bracket 28 secured as by bolts 28a to the bracket 14 and includes a bellows 27a and chambered cap 27b. To render the capsule 27 responsive to changes in temperature only, it may be filled with a suitable fluid responsive to temperature but substantially unaffected by the pressures normally encountered, or it may be provided with a combination of liquid and gas to give it some pressure response in addition to its temperature response. Obviously, the capsule 27 should have a degree of responsiveness or expansion capacity within a certain ratio to that of the pressure-responsive bellows 10 although no close tolerances are required since correlation is effected primarily by the interconnecting linkage mechanism. A nut 29 serves to anchor the capsule to the bracket 28.

The lower end of the capsule 27 is provided with a yoke 30 which has pivotally connected thereto the one arm of a bell-crank lever 31, said lever being fulcrumed at 32 to a lug or boss 33 projecting from the underside of the bracket 14. At its lower end the lever 31 is provided with a pivot pin 34 which slidably engages an elongated cam slot 35 formed in the left-hand extremity of the arm or lever 17 carried by the pressure-responsive bellows 10.

The long arm of the bell-crank lever 31 is variable or adjustable as to length, and accordingly is of two-part construction with one part formed with guides 36 engaging the other part, the contiguous ends having screw-threaded bosses projecting outwardly therefrom in which is threaded a reversely-acting connecting screw having an adjusting nut 37 centrally thereof. By adjusting the nut 37, the long arm of the lever 31 may be varied in length, thereby providing a convenient means for positioning the pin 34 vertically with respect to the pressure unit 10 and lever 17. Likewise, the short arm of the lever 31 may have its throw varied, as by mounting the pivot 38 in a slidable bearing block and locating the latter in elongated slot 39, the bearing block having a journaled or swiveled connection with the inner end of an adjusting set screw 39a. To permit change of location of the capsule 27 to conform to this adjustment, the bracket 28 may be slotted at the point where the bolts 28a pass therethrough.

The particular manner in which the improved density control device operates is dependent upon the temperature compensation or correction factor to be applied to the valve element 20. Thus, in Figure 1 the pressure unit or bellows 10 expands and contracts in relation to changes in external pressure, while the temperature-responsive unit or capsule 27 expands and contracts in relation to changes in temperature, correction or compensation for changes in density due to changes in temperature at constant pressure and changes in pressure at varying temperatures taking place through the lever 31, pivot or axis 34, slot 35 and lever 17. In this instance, the correction is such that for a given temperature change, the motion imparted to valve element 20 will vary in proportion to the absolute pressure on bellows 10; that is, at high barometric pressures a given temperature change will impart a greater motion to the valve than at low barometric pressures, this being desirable for the reason that a given change in temperature causes a greater increment change in density at high pressure than at low pressure.

The parts in full lines are approximately in the position they assume when subjected to a barometric pressure in the neighborhood of 29.5 inches of mercury and a temperature of 60° F., the bellows 10 and capsule 27a at this time being partially collapsed and balanced at ground level conditions and the slot 35 being at an acute angle to the radial line from the pivot 32 to the pin 34. At this time, a given increase in absolute temperature will cause the bellows 27a to expand and rotate lever 31 and pin 34 in a clockwise direction, and due to the angularity of the slot 35 will move valve 20 downwardly a predetermined amount. As the barometric pressure decreases, as with increase in altitude, the bellows 10 expands and lever 17 approaches the dotted line position, and the slot 35 approaches more nearly a right angle relation with respect to the radial line from pivot 32 to pin 34, whereby the same temperature change previously discussed will move the valve 20 downwardly a lesser amount.

Should there be a drop in external pressure, due, for example, to a gain in altitude, and should there at the same time be a drop in temperature, the bellows 10 would expand, with resultant downward movement of the lever 17 and valve 20 while at the same time bellows 27a would collapse, causing a movement of the pivot 34 to the right tending to move valve 20 upwardly, to correct for change in density due to a change in pressure with a simultaneous change in temperature. As additional altitude is attained, changes in external pressure will be of less magnitude, although the bellows 10 will during the gradual drop in pressure be extending itself and lowering the lever 17 until it reaches the dotted line position; and any action on arm or lever 17 due to a change in temperature during this interval will be in less magnitude and in proportion to the change in pressure, since as the bellows 10 extends itself, the throw on lever 17 is gradually lessened until it reaches a minimum. Thus, the temperature correction at any time will be in direct relation to and correlated with the existing pressure.

By changing the initial setting of the pivotal axis 34 with respect to the bellows 10, temperature compensation may be caused to become effective at selected altitudes and in different magnitudes at selected altitudes. Thus, by reversing the full line lever position shown in Figure 1, the unit may be made to compensate for temperature to a greater extent at high altitude and a lesser extent at low altitudes. This is illustrated in Figure 2, where the pressure-responsive bellows 10' is loaded with a damping fluid and an inert gas. This type of density control capsule is particularly desirable for use in aircraft power units since the oil stabilizes the action of the bellows and tends to smoother operation and longer life. However, there is a tendency in an oil and gas-filled capsule to overcompensate for temperature at high altitudes, resulting in a leaning out of the mixture at high temperatures which is contrary to aircraft engine practice since it causes excessive heating of the charge and detonation. Ordinarily, such a unit will give correct temperature compensation at seat level pressure but will overcorrect for temperature changes at high altitudes due to different combinations of internal and external pressures and temperatures as the bellows extends itself. Thus, in Figure 2, the temperature correction accomplished by bellows controlled lever 31' is applied in a direction opposite to that shown in Figure 1. This is accomplished by the different angularity of slot 35' to the radial line through pivot 32' and pin 34' in comparison with Figure 1. Any movement imparted to the lever 31' due to temperature changes are transmitted to the lever 17' in amounts approaching a maximum as the bellows extends itself due to drop in pressure, and vice versa, note the full and dotted line positions. Parts in Figure 2 which correspond to like parts in Figure 1 has been given the same reference numerals except that a prime (') has been added.

In cases where decreased temperature compensation for a given change in pressure is desired, as for example, in proportion to pressure divided by the square root of temperature, it is only necessary to correspondingly reduce the throw of the lever 31 which in turn will reduce the cam action of the pivot 34 in the slot 35. This may be done in a number of different ways. For example, the capsule 27 could be loaded in a manner such as to reduce its capacity a predetermined amount with respect to the bellows 10, as by predetermined ratios of a damping fluid and an inert gas; or the lever 31 could have the bell-crank portion thereof made longer to thereby shorten the throw or travel of the pivot 34 for a given stroke of bellows 27a. In either case, the response due to changes in temperature will be reduced in magnitude with respect to changes in pressure, and temperature compensation will be correspondingly reduced.

By adjusting the length of the long arm of the lever 31, the upper and lower limits of travel of the needle valve 20 may likewise be adjusted with respect to the port 22; and such adjustment may also prove helpful in accurately locating the axis or pivot 34.

In Figure 3 the device is arranged and constructed in a manner such as to provide a straight line action between the pressure unit and temperature unit and coacting linkage. A pressure-responsive capsule or bellows is generally indicated at 61 and is supported at its upper end from an extension 62 of main supporting bracket 63, the lower or extension end of the bellows 61 being provided with a yoke 64 which pivotally supports a lever 65 carrying a needle valve 66 at its one end and provided with an elongated cam slot 67 at its opposite end.

A temperature-responsive capsule is indicated at 68 and is anchored at its one end to the bracket 63 and at its opposite end is provided with a sealing cap 69 supported on a slide 70 mounted in a slide-way provided on the bracket 63. The movable end of the capsule or bellows 68 has connected thereto a link or arm 71 which extends downwardly and is provided with a pin 72 engaging in the slot 67. The bracket 63 is adapted to be mounted in an air scoop adjacent a carburetor deck similar to the bracket 14 in Figure 1, and the needle valve 66 may function in the same manner as the corresponding needle valve 21 in Figure 1.

In operation, any change in density due to a change in pressure at constant temperature will result in elongation or contraction of the bellows 61 with the axis 72 remaining fixed; but should such change in density result from a change in pressure and a simultaneous change in temperature, then the capsule 68 will respond and shift the pivot point 72 in the slot 67 and correspondingly change the throw of the lever 65. On the other hand, should the change in density result from a change in temperature only, then the pivot 72 will effect a cam action against the side walls of the slot 67 and vary the position of the needle valve accordingly.

By making the bellows 61 responsive to changes in pressure only and the bellows 68 responsive to changes in temperature only, the travel of the pressure bellows or unit will be in direct proportion to the travel of the temperature unit, and the travel of the needle valve will therefore be proportional to pressure divided by temperature which in turn is proportional to density. By properly positioning the lever 65 and pivot 72 at the initial setting of the unit, the needle valve may be made to travel as a function of pressure divided by the square root of temperature or some function between pressure divided by temperature and pressure divided by the square root of temperature.

While the cam slots 35, 35' and 57 are shown with straight side walls or pin-contacting surfaces coacting with an arcuately-movable pivot, it will be obvious that said surfaces could be contoured to give the desired temperature correction with travel of the pivot pin.

It will be understood that the devices illustrated herein may be further modified in the construction and arrangement of the several parts and still obtain the desired compensating or correction action within the teachings of the invention and without departing from the scope of the appended claims; and that the unit may find use as a control in numerous devices other than carburetors, the latter being shown simply to illustrate an advantageous use to which the control unit may be applied.

I claim:

1. A device for controlling a valve member or the like in response to changes in density of ambient air, comprising an element responsive to changes in the pressure component and an element responsive to changes in the temperature component, linkage mechanism interconnecting said elements and valve member including a part having movement imparted thereto by the pressure-responsive element and another part having movement imparted thereto by the temperature-responsive element and a sliding pivot and cam slot correlating the movement of said parts in a manner such that a change in density due to a simultaneous change in the pressure and temperature components causes shifting of said pivot in its slot during movement of the pressure-actuated part and resultant modification of the throw of the pressure-actuated part, a change in density due to a change in the pressure component at constant temperature causes the pressure-actuated part to fulcrum about the pivot without shifting of the latter to produce movement of said part in direct relation to the pressure response, and a change in density due to a change in the temperature component at constant pressure causing the pivot to shift in the slot and effect a cam action on the pressure-actuated part to produce movement of the latter in direct relation to the temperature response.

2. A density-control device comprising in combination with an element to be controlled, a pressure-responsive element and a temperature-responsive element, a member actuated by the pressure-responsive element having a combined cam and pivot slot formed therein and another member actuated by the temperature-responsive element having a pivot engaging in said slot, said pressure-actuated member being connected to the element to be controlled to impart travel thereto, a change in density at constant temperature producing movement of the pressure-actuated member about said pivot and a change in density as a result of varying pressure and temperature producing movement of the pressure-actuated member about said pivot and a simultaneous shift of the pivot in the slot to modify the action of said latter member.

3. A device for controlling a valve member or the like in response to changes in density comprising a pressure-responsive element and a temperature-responsive element and linkage mechanism connecting said elements for conjoint operation to regulate the travel of said valve member, said linkage including an arm having an operative connection with said valve member and movable in relation to response of the pressure element and an arm movable in relation to the response of the temperature element, means providing an operative connection between said arms including a pivot carried by the temperature arm and an elongated cam slot carried by said pressure arm and receiving said pivot, said slot being contoured to produce a modifying action of the temperature arm on the pressure arm in proportion to some preselected function of pressure and temperature.

4. A device for controlling an element in response to changes in density comprising a pressure-responsive capsule and a temperature-responsive capsule, linkage mechanism interconnecting said capsules and said element including a lever actuated by said temperature capsule and another lever actuated by said pressure capsule and connected to the element to be controlled, said temperature capsule lever being provided with a pivot and said pressure capsule lever being provided with an elongated slot receiving said pivot, response of said pressure capsule to changes in pressure at constant temperature producing movement of the pressure capsule lever about said pivot and a response of both capsules to a change in density resulting from a change in both pressure and temperature causing the temperature capsule arm to modify the action of the pressure capsule arm.

5. A device for controlling a member in response to changes in density comprising a pressure-responsive capsule and a temperature-responsive element, linkage mechanism interconnecting said capsule, temperature element and said member for coordinated operation including an arm pivotally connected to said capsule and said member and another arm connected at one end to said temperature element and having a pivot at its opposite end engaging in an elongated slot in said pressure-controlled arm, a change in density resulting from a simultaneous change in pressure and temperature causing said pivot to shift in said slot during movement of the pressure-controlled arm and modify the action of said pressure-controlled arm, a change in density due to a change in the pressure component at constant temperature causes the pressure-controlled arm to fulcrum about the pivot without shifting of the latter to produce movement of the said member in direct relation to the pressure response, and a change in density due to a change in the temperature component at constant pressure causing the pivot to shift in the slot and effect a cam action on the pressure controlled arm to produce movement of said member in direct relation to the temperature response, preselected values of temperature compensation or correction being obtainable by initially setting the pressure-controlled lever at a predetermined angle with respect to the temperature-controlled lever with the pressure capsule in a predetermined state of extension.

6. A device for controlling a member in response to changes in density comprising a pressure-responsive capsule and a temperature-responsive element, linkage mechanism interconnecting said capsule, temperature element and said member for coordinated operation including an arm pivotally connected to said capsule and said member and another arm connected at one end to said temperature element and having a pivot at its opposite end engaging in an elongated slot in said pressure-controlled arm, a change in density resulting from a simultaneous change in pressure and temperature causing said pivot to shift in said slot during movement of the pressure-controlled arm and modify the action of said pressure-controlled arm, a change in density due to a change in the pressure component at constant temperature causes the pressure-controlled arm to fulcrum about the pivot without shifting of the latter to produce movement of the said member in direct relation to the pressure response, and a change in density due to a change in the temperature component at constant pressure causing the pivot to shift in the slot and effect a cam action on the pressure-controlled arm to produce movement of said member in direct relation to the temperature response, preselected values of temperature compensation or correction being obtainable by initially setting the pressure-controlled lever at a predetermined angle with respect to the temperature-controlled lever and with the pressure capsule in a predetermined state of extension and means for adjusting the position of said pivot with respect to said pressure capsule and arm controlled thereby.

7. A carburetor comprising an air passage with an air supply and a liquid fuel supply thereto, means for supplying fuel to said air passage in proportion to the velocity of air flow therethrough, and means for compensating said fuel supply for variations in density of said air supply, including an element, insensitive to ambient temperature changes, but responsive to the pressure of said air supply, operatively associated with an element responsive to the temperature of said air supply and insensitive to the pressure thereof.

FRANK C. MOCK.

References Cited in the file of this patent

UNITED STATES PATENTS

| Number | Name | Date |
| --- | --- | --- |
| 1,913,684 | Purdy | June 13, 1933 |
| 1,978,709 | Hill | Oct. 30, 1934 |
| 2,013,138 | De Giers | Sept. 3, 1935 |
| 2,183,710 | Deming | Dec. 19, 1939 |
| 2,185,578 | Beardsley et al. | Jan. 2, 1940 |
| 2,264,869 | Beardsley | Dec. 2, 1941 |
| 2,376,711 | Mock | May 22, 1945 |
| 2,416,453 | Mather et al. | Feb. 25, 1947 |

FOREIGN PATENTS

| Number | Country | Date |
| --- | --- | --- |
| 135,557 | Great Britain | Dec. 4, 1919 |